Oct. 28, 1930.  W. E. NICKERSON  1,779,981
MECHANICAL MOVEMENT
Filed Sept. 12, 1927
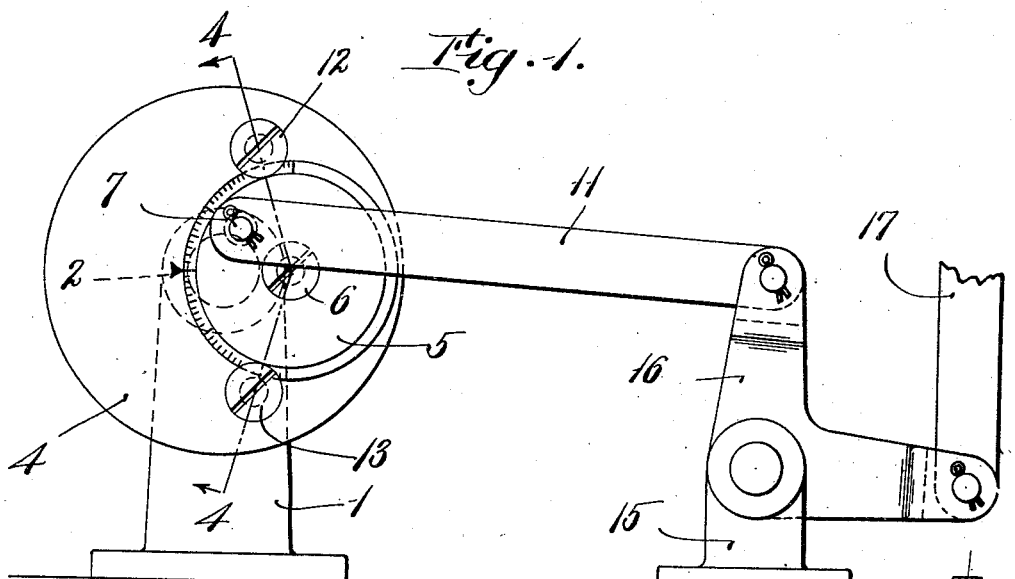
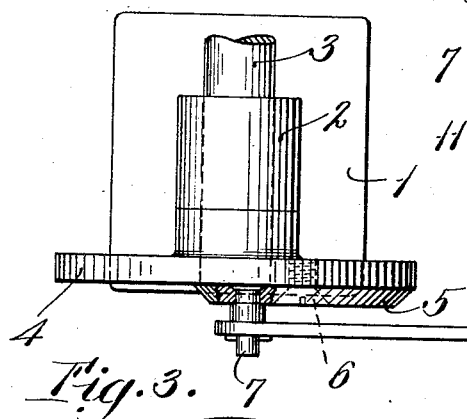
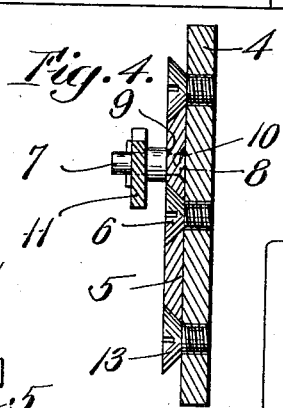
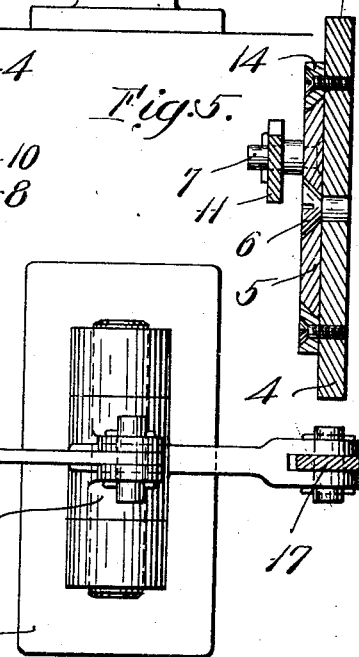
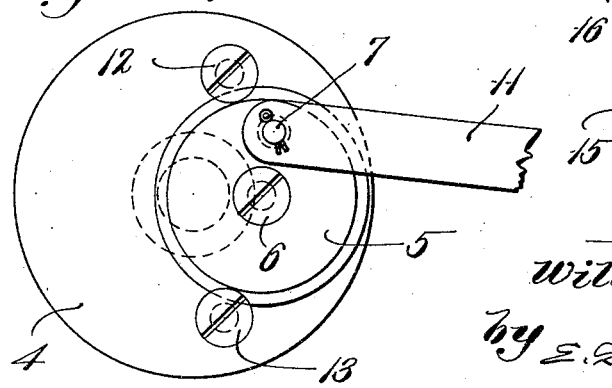
Inventor:
William E. Nickerson
by E. D. Chadwick atty.

Patented Oct. 28, 1930

1,779,981

UNITED STATES PATENT OFFICE

WILLIAM EMERY NICKERSON, OF BOSTON, MASSACHUSETTS, ASSIGNOR TO GILLETTE SAFETY RAZOR COMPANY, OF BOSTON, MASSACHUSETTS, A CORPORATION OF DELAWARE

MECHANICAL MOVEMENT

Application filed September 12, 1927. Serial No. 218,962.

This invention relates to mechanical movements and more particularly to mechanism wherein a variable throw crank is used in producing vibrating motion of varying amplitudes.

My invention contemplates the provision of mechanism including a crank member having a crank pin which may be conveniently adjusted thereon in a curved path above a center eccentric to that of the crank member. Such construction facilitates positive and accurate adjustment and setting of the crank pin. It may be used equally well in horizontal or vertical position. It involves no problems of lubrication and is simple and inexpensive to produce and reliable in operation.

Difficulty has been experienced heretofore in clamping the crank pin firmly in adjusted position, due partly to the continual reversal of stress upon it in use. With these conditions in view an important feature of the present invention consists in a crank pin mounted in an eccentric adjusting disk which may be turned to adjust the position of the crank pin and which is provided with clamping means acting on the opposite sides thereof to hold the disk by edge engagement when the adjustment of the crank pin has been effected.

These and other features of the invention will be best understood and appreciated from the following description of a preferred embodiment thereof selected for the purposes of illustration and shown in the accompanying drawings, in which:

Fig. 1 is a view in side elevation.
Fig. 2 is a plan view.
Fig. 3 is a view in side elevation similar to Fig. 1 but showing the parts in a different adjusted position.
Fig. 4 is a sectional view on the line 4—4 of Fig. 1 and
Fig. 5 is a similar view of a modified construction.

A suitable standard or support 1 carries a bearing 2 for a shaft 3 which may be either a driving or a driven shaft. A crank member herein shown as a crank disk 4 is secured to one end of the shaft 3. An adjusting disk 5 is mounted on the crank disk 4 by means of a central screw 6 and two screws 12 and 13 which engage its edge. As herein shown the adjusting disk 5 is smaller than the crank disk 4 and mounted with its center of rotation offset with respect to the center of the crank disk 4 and the axis of the shaft 3. A crank pin 7 is carried by the adjusting disk 5 having a reduced portion 8 terminating in the shoulder 9 which engages the face of the disk. The reduced portion 8 extends through the disk 5 and is riveted on the inner side as shown at 10.

The adjusting disk 5 is adapted to be secured in any position of adjustment upon the crank disk 4. To this end its outer edge is bevelled and adapted to be engaged by the tapering surfaces of the heads of the screws 12 and 13. When it is desired to adjust the position of the crank pin 7, the three screws 6, 12 and 13 are loosened and the adjusting disk 5 turned, carrying the crank pin in a curved path to a point at the desired distance from the axis of the crank disk. The adjusting disk 5 is then locked in position by setting up the three screws mentioned.

It will be noted that the screws 12 and 13 constituting the clamping means act upon the disc 5 at points upon its periphery, and these are consequently more remote from the axis of the disc than the crank pin 7. The clamping action of the screws, therefore, is maximum in its effect upon the disc and in offsetting the thrust upon the crank pin.

As herein shown the offset distance between the centers of the two disks is the same as the radius of the crank pin 7 with respect to the adjusting disk 5. This construction renders it possible to vary the effective position of the crank pin from one in which it coincides with the axis of the crank disk 4, and in which its motion is consequently zero, to a position in which its distance from the center of rotation is double the length of its radius in the adjusting disk 5 and in which its throw is a maximum. By increasing the diameter of the adjusting disk 5 the range of adjustment of the crank pin 7 may be extended within the limits of the crank disk.

A second standard 15 is shown upon which is mounted a bell crank lever 16, one arm of which is connected to the crank pin 7 through a link 11. The other arm of the lever 16 is connected to a second link 17 for oscillating any desired part of a machine in a pre-determined path of adjustable amplitude.

An index mark may be provided upon the crank disk 4 to cooperate with a scale on the adjusting disk 5 or vice versa whereby any desired adjustment of the disk may be accurately made and quickly reproduced.

In Fig. 5 there is illustrated alternative means for holding the adjusting disk 5 in position on the crank disk 4. This comprises an annular ring 14 having a bevelled inner surface complementary to the periphery of the adjusting disk 5 and suitable means such as screws for locking the ring upon the periphery of the adjusting disk. This modified holding means might be used to advantage where the transmission of considerable power is contemplated.

Having thus described my invention, I claim:

1. Mechanism comprising a shaft, a crank disc mounted thereon, a second disc member rotatably mounted on said first disc and having its center of rotation spaced from the axis of said shaft, and a crank pin on said second disc at a distance from its center substantially the same as the distance between the axis of said shaft and the center of rotation of said second disc, the periphery of said second disc being outwardly bevelled and extending beyond the crank pin, an annular ring having its inside edge bevelled to correspond to the bevel of said second disc, and means to clamp said ring to the first named disc, whereby it will engage said second named disc in a location further from the axis of the disc than the crank pin and retain the disc in any desired relatively rotated position to determine the throw of the crank pin.

2. Mechanism comprising a shaft, a crank disc mounted thereon, a disc rotatably mounted on the crank disc by a screw extending through the second disc into the first mentioned disc at a point spaced from the axis of said shaft, a crank pin mounted in said second disc at a point spaced from its center a distance substantially the same as the distance between the axis of said shaft and the center of rotation of said second disc, said second disc having its edge bevelled outwardly toward the first disc, and an annular ring having a complementary bevel adapted to engage the bevelled edge of the second disc in a location more remote from its axis than the crank pin, and screws to fasten said ring to the first disc, whereby said crank pin may be retained at any desired distance from the center of said shaft from zero to twice the distance between the centers of the two discs.

3. Adjustable crank pin mechanism comprising a crank disk, an eccentric disc mounted upon the surface thereof and having a crank pin which projects outwardly therefrom at a point within its periphery, and clamping means coextensive with the periphery of said eccentric disk and acting to hold the latter by edge engagement in any adjusted position thereof.

4. Adjustable crank pin mechanism comprising a crank disk, an eccentric adjusting disk mounted upon the surface thereof, having a bevelled periphery and carrying a crank pin at a point within its periphery, and clamping means located outside its periphery and acting at opposite sides of said eccentric disk outside the crank pin and upon the bevelled periphery thereof to hold said disk by edge engagement in any desired position of adjustment.

Signed at Boston, Massachusetts, this seventh day of September, 1927.

WILLIAM EMERY NICKERSON.